United States Patent
Schäfer et al.

(10) Patent No.: US 12,202,045 B2
(45) Date of Patent: Jan. 21, 2025

(54) DOCTOR BLADE UNIT FOR AN ADDITIVE MANUFACTURING SYSTEM HAVING A PULVEROUS STARTING MATERIAL

(71) Applicant: ALD VACUUM TECHNOLOGIES GMBH, Hanau (DE)

(72) Inventors: Karsten Schäfer, Hünfeld (DE); Arno Niebling, Linsengericht (DE); Fuad Osmanlic, Seligenstadt (DE)

(73) Assignee: ALD VACUUM TECHNOLOGIES GMBH, Hanau (DE)

( * ) Notice: Subject to any disclaimer, the term of this patent is extended or adjusted under 35 U.S.C. 154(b) by 356 days.

(21) Appl. No.: 17/798,808

(22) PCT Filed: Feb. 26, 2021

(86) PCT No.: PCT/EP2021/054932
§ 371 (c)(1),
(2) Date: Aug. 10, 2022

(87) PCT Pub. No.: WO2021/175737
PCT Pub. Date: Sep. 10, 2021

(65) Prior Publication Data
US 2023/0150032 A1    May 18, 2023

(30) Foreign Application Priority Data
Mar. 4, 2020   (DE) .......................... 102020105819.5

(51) Int. Cl.
*B22F 12/67*    (2021.01)
*B33Y 30/00*    (2015.01)

(52) U.S. Cl.
CPC .............. *B22F 12/67* (2021.01); *B33Y 30/00* (2014.12)

(58) Field of Classification Search
None
See application file for complete search history.

(56) References Cited

U.S. PATENT DOCUMENTS 9,174,391 B2   11/2015   Hartmann et al.
9,993,975 B2   6/2018   Hartmann et al.
(Continued)

FOREIGN PATENT DOCUMENTS

CN   106346005 B       4/2018
CN   209363616 U   *   9/2019
(Continued)

OTHER PUBLICATIONS

English translation of CN 115338433 A to Sun et al., publication date Nov. 15, 2022. (Year: 2022).*
(Continued)

*Primary Examiner* — Leslie J Evanisko
(74) *Attorney, Agent, or Firm* — Barnes & Thornburg LLP; Ryan L. Marshall

(57) ABSTRACT

The present invention relates to a doctor blade unit for an additive manufacturing system having a pulverous starting material. By means of the doctor blade unit according to the invention, improved linearity of the doctor blade and parallelism with respect to the build plane are achieved. The doctor blade is suspended on a crossmember by means of adjustable fastening elements, and the crossmember in turn is fastened, on one side by means of a fixed bearing and on the other side by means of a floating bearing, to a guide support.

18 Claims, 4 Drawing Sheets

(56) References Cited

U.S. PATENT DOCUMENTS

| | | | |
|---|---|---|---|
| 2011/0219966 A1* | 9/2011 | Willshere | B41F 15/423 |
| | | | 101/123 |
| 2013/0004610 A1 | 1/2013 | Hartmann et al. | |
| 2016/0001507 A1 | 1/2016 | Hartmann et al. | |

FOREIGN PATENT DOCUMENTS

| | | | |
|---|---|---|---|
| CN | 108705773 B | | 9/2020 |
| CN | 115338433 A | * | 11/2022 |
| DE | 102010013733 A1 | | 10/2011 |
| DE | 102012012412 A1 | | 3/2014 |
| DE | 202013004745 U1 | | 8/2014 |
| DE | 102017010474 A1 | | 5/2019 |
| EP | 2010370 B1 | | 4/2011 |

OTHER PUBLICATIONS

English translation of CN 209363616U to Wu, publication date Sep. 10, 2019. (Year: 2019).*
International Search Report dated Apr. 30, 2021, prepared in International Application No. PCT/EP2021/054932.

* cited by examiner

DOCTOR BLADE UNIT FOR AN ADDITIVE MANUFACTURING SYSTEM HAVING A PULVEROUS STARTING MATERIAL

This application is a National Stage application of International Application No. PCT/EP2021/054932, filed Feb. 26, 2021. This application also claims priority under 35 U.S.C. § 119 to German Patent Application No. 10 2020 105 819.5, filed Mar. 4, 2020.

The present invention relates to a doctor blade unit for an additive manufacturing system with a pulverous starting material. An improved linearity of the doctor blade and parallelism with respect to the construction level are achieved by way of the doctor blade unit according to the invention.

Devices and methods for additive production of workpieces (also known under the term additive manufacturing (AM)) are known from the prior art. "Generative manufacturing methods" or "3D printing" are also spoken of. Here, the raw material can be in powder form, wire form or liquid. The powder methods include, for example, selective laser melting (SLM), selective laser sintering (SLS) or electron beam melting (EBM). The raw material consists of plastics or metals here.

In the case of the methods which operate with a raw material in powder form, the material is applied in the form of a layer onto a lowerable working surface, in order to be melted or sintered there in sections. Subsequently, the working surface is lowered by a layer thickness. A further layer is then applied to the layer, and the procedure is carried out as with the first layer. Here, the sections to be melted or to be sintered are selected in such a way that the three-dimensional workpiece is constructed layer by layer.

For the quality of the components, it is essential that the individual layers have a homogeneous thickness. In particular, the layer must both be of identical thickness in the entire plane and also lie parallel to the construction level which initially lies on the lowerable working surface and afterward then on the respective previously processed layer. In order to achieve this, a correspondingly precise application of powder is required, which in turn first and foremost requires a highly precise doctor blade and doctor blade guidance. Here, two problems occur in the case of the doctor blades of the prior art, which problems become more serious the larger the doctor blade becomes and the higher the temperatures in the construction space become. One of these is a deflection of the doctor blade, which causes a deviation from the linearity of the doctor blade and therefore a thinner powder layer, as a rule in the center of the movement path, and the second one is the thermal expansion.

If the additive manufacturing methods were initially pure rapid prototyping methods which supplied only design models and often on a reduced scale, the technology has advanced in the meantime to such an extent that even larger functional components can be constructed. In particular, in addition to the powder materials which consisted initially exclusively of polymers, materials made from metal, glass and ceramic are now also available. Accordingly, the requirements for the construction space size have also grown and, with them, the required doctor blade sizes, which entails the above-mentioned problems.

Furthermore, the processing of metals or ceramic requires a considerably higher melting or sintering temperature than the plastics. Therefore, in addition to more powerful lasers, electron beam guns are also used for these methods as radiation units which can input more energy into the powder. The temperatures which are generated in this way also heat the doctor blade which distributes the powder, which has been newly applied to the last layer which has just solidified, to form the new layer. The thermal expansion of the doctor blade which occurs in the process generates stresses and deformations in the doctor blade between the fastening points.

Thermal problems occur inherently in the case of the polymer powders only to a lesser extent, since only temperatures typically of up to approximately 180° C. occur in the preheated powder bed there, whereas temperatures of up to over 1200° C. are required on the preheated powder bed surface in the case of metals such as titanium and titanium alloys. Therefore, the greatest problems arise in the case of electron beam methods with metal powders which are the main field of application of the present invention. There, temperatures of approximately 400° C. in the center of the doctor blade and approximately 50° C. in its edge regions which do not lie above the powder bed typically occur, for example, at the blade of the doctor blade. As a result, a considerable stress is generated in the suspension system of the blades and in the blades themselves by way of the resulting thermal expansion to different extents. This causes a deviation from the linearity.

PRIOR ART

EP 2 010 370 B1 describes, for example, a powder application device which is intended to make simple changing possible and, in the process, to maintain the parallelism with respect to the construction level. Here, an exchangeable coating module which can be inserted into a frame-shaped receiving device is utilized. Two blades are screwed at the edges via a web in the coating module. The setting of the blades with respect to the construction level takes place via the frame-shaped receiving device, into which the coating module can be hooked by way of the webs. There is therefore the problem that the blades which are mounted only on the outer sides can deflect in the case of relatively large dimensions. In the case of the occurrence of thermal distortion, the double suspension has a particularly negative effect, firstly the blades in the coating module in the frame-shaped receiving device, and then the frame-shaped receiving device in the overall device, on the linearity and parallelism of the blades with respect to the construction level.

Object

Proceeding from these problems, it was an object of the present invention to provide a doctor blade unit, by way of which the disadvantages of the devices from the prior art are overcome. In particular, it is the object of this invention to provide a device which is capable of applying powder layers which are particularly homogeneous and are oriented parallel to the construction level, even in the case of large dimensions and high operating temperatures.

DESCRIPTION OF THE INVENTION

This object is achieved by way of a doctor blade unit as claimed in claim 1. Preferred design variants are the subject matter of the dependent claims.

The doctor blade unit according to the invention for an additive manufacturing system with a pulverous starting material comprises a doctor blade and a suspension system which is to be mounted in a horizontally movable manner in the additive manufacturing system.

If a doctor blade is mentioned in the present application, this term comprises both the actual blades and a composite unit which is formed with them, for example therefore, in the case of a double blade, the two blades and the means which connect them.

The suspension system comprises a crossmember which is mounted on the one side in a locating bearing and on the other side in a floating bearing, the crossmember being connected via the locating bearing and the floating bearing in each case to a guide bracket.

The doctor blade is fastened in a suspended manner below the crossmember via a multiplicity of fastening means along its length, the fastening means permitting a spacing adjustment between the doctor blade and the crossmember for the parallel orientation of the doctor blade with respect to a construction level of the additive manufacturing system. To this end, in accordance with the length of the doctor blade, a number of fastening means is to be provided which keeps the spacings between them sufficiently short, in order to prevent deflection and to make a precise adjustment of the linearity of the suspended doctor blade possible. The parallelism with respect to the construction level can then be established via the entirety of the adjustable fastening means.

The essential aspect is the planarity of the applied layer. Here, limits are placed on the maximum achievable position by way of the powder grain size of the metal powder which is used. By way of the doctor blade system according to the invention, a planarity of the powder layer is aimed for which corresponds to a deviation of less than half the average powder grain diameter $d_{50}$. Customary metal powders for the EBM method currently lie at an average powder grain diameter $d_{50}$ of approximately 50 µm. For special cases, powders with small diameters are also used. Accordingly, the precision which is aimed for customary system operation lies at a deviation of at most 25 µm, preferably at most 10 µm.

The doctor blade can comprise a single blade, double blade or multiple blade. They are arranged below a solid block centered symmetrically in the middle, through which solid block the fastening means run to the crossmember. The connection to the block takes place within cutouts which are arranged in the region of the perpendicular fastening means, by means of horizontal bolts and spacer elements which are inserted between the individual blades. The blades consist of flexible thin metal sheets, into which a comb-like toothing system is machined, in order that they can adapt in a flexible manner to unevennesses. Pre-wipers are screwed on parallel to the blades on the side of the block. With their lower edge, they are at a spacing from the lower edge of the blades of usually up to 1 mm, as a rule approximately 0.5 mm. The pre-wipers fulfill the purpose of minimizing the pressure by way of the powder on the blade and of bringing about a first distribution and smoothing of the powder. The entire block is covered with a roof-like construction which can be a flat, curved or angular configuration.

The guide brackets are preferably suitable for guidance with torque rigidity in the additive manufacturing system. Guidance with torque rigidity means that the guide brackets are connected to the additive manufacturing system in such a way that a transmission of torque from the guide brackets to the additive manufacturing system is possible. Therefore, only translational movements in the provided direction over the construction level are possible, but not in other spatial directions or rotations.

The horizontally movable mounting of the suspension system in the additive manufacturing system can take place, for example, via rails or guide rods. They can be present singly or multiply, in particular doubly, on each side. They do not have to be oriented horizontally and act as a support, but rather can also preferably be oriented vertically. The latter is advantageous, above all, in the case of an embodiment of the rails and the rail receptacle of the guide bracket in the form of a dovetail-like connection and double rails in order to configure the connection with torque rigidity of the guide brackets to the construction space of the additive manufacturing system.

The crossmember of the doctor blade unit can be configured as a hollow body. This contributes to the weight reduction with at the same time high rigidity. Here, the hollow body can be open on the end sides, that is to say can be tubular, or can be closed. The crossmember preferably has a rectangular or oval cross section. This provides a greater resistance to torques in the case of the mounting.

The locating bearing preferably encloses the crossmember on its periphery on at least two sides, and prevents a movement of the crossmember relative to the locating bearing in all three spatial directions.

A centering pin can be attached to the inner periphery of the locating bearing, which centering pin is in positively locking engagement with a corresponding bore in the crossmember. Reliable positioning of the crossmember on the guide brackets is achieved in this way. In addition, the centering pin assists the fastening of the crossmember and prevents, in particular in a plane parallel to the construction level, a movement of the crossmember in an orthogonal direction with respect to the movement direction of the crossmember over the construction level.

The floating bearing can enclose the crossmember on its periphery with sliding elements in such a way that a movement of the crossmember relative to the floating bearing along its longitudinal axis is made possible, while a movement in the two spatial directions which are perpendicular with respect thereto is prevented. If the doctor blade and the crossmember expand in the case of a temperature increase, a compensation movement can take place via this, with the result that no stresses which can lead to a deformation occur in the doctor blade.

The doctor blade preferably has a length of from 0.1 to 5 m, preferably of from 0.2 to 4.5 m or of from 0.25 to 4 m or of from 0.3 to 3 m or of from 0.3 to 2.5 m. The advantages of the doctor blade unit according to the invention are greater, the longer the doctor blade.

The parallelism deviation ΔP, defined as the difference between the greatest and smallest spacing between the doctor blade and the construction level, is preferably from 1 to 50 µm, preferably from 2 to 45 µm or from 3 to 40 µm or from 4 to 35 µm or from 5 to 30 µm or from 10 to 25 µm. In accordance with the definition, the parallelism deviation ΔP detects both inclinations of the doctor blade and deviations from the linearity. It is a measure of the quality of the adjustment of the doctor blade. The doctor blade unit according to the invention therefore achieves excellent uniformness of the layer thicknesses and, as a result, achieves improved component properties. Thus, for example, smaller layer thicknesses can still be produced reliably, as a result of which the surface quality and the resolution increase.

The suspension system preferably has from 3 to 30, preferably from 3 to 25 or from 3 to 20 or from 3 to 15 or from 3 to 10 or from 3 to 5, fastening means per meter of doctor blade length. This number of fastening points has proved to be sufficient, in order for it still to be possible for the linearity of the doctor blade to be set reliably even in the case of very long doctor blades and high operating temperatures.

The fastening means are preferably screwed bolts. Here, the bolts have to have a sufficiently long thread, in order for it to be possible for the necessary adjustment travel to be provided. The bolts can then be adjusted simply by means of a nut. This takes place during the installation of the doctor blade. If required, the individual bolts can then be readjusted, in order to re-establish linearity and parallelism.

In the case of the doctor blade unit, in one preferred design variant, during running operation of the additive manufacturing system, a change in the spacing of the doctor blade from the crossmember is possible by means of electromechanical and/or hydraulic actuators which act on the fastening means. In this automatic variant of the doctor blade unit, the deviation from the linearity and parallelism is measured and monitored via optical and/or mechanical sensors. This information is then used to actuate actuators, such as actuating motors or hydraulic lines with actuators, for example, which correct the length of the fastening means accordingly, in order to re-establish linearity and parallelism. With the aid of this active system, a further improvement of the evenness of the layer thicknesses can once again be achieved and, as a result, component properties which are further improved. In particular, this affords the advantage that the additive manufacturing system does not have to be stopped here for readjustment, with the result that interruption-free operation becomes possible.

DESCRIPTION OF THE FIGURES

The figures show merely one preferred design variant as an example for the invention. They are therefore not to be understood as restrictive.

Figure 1:
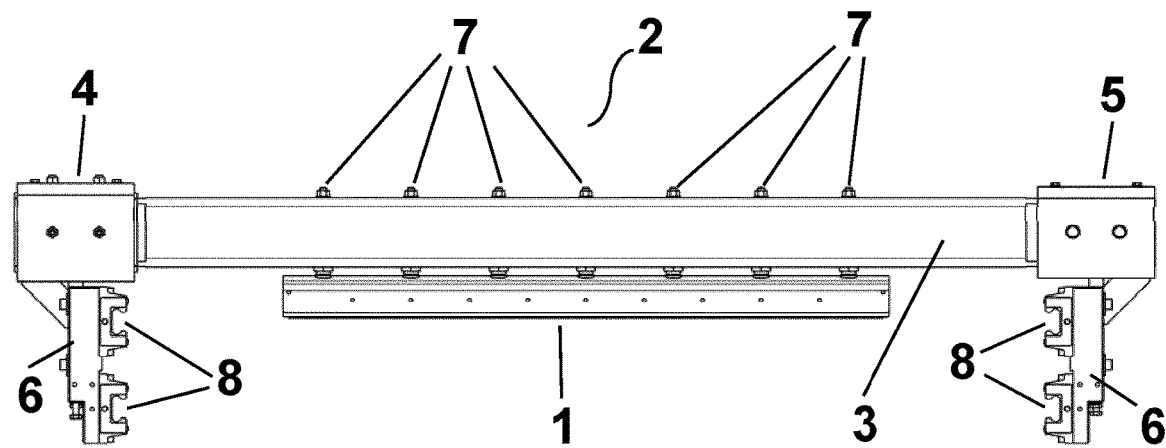
FIG. 1 is a lateral sectional view of the doctor blade unit.
Figure 2:
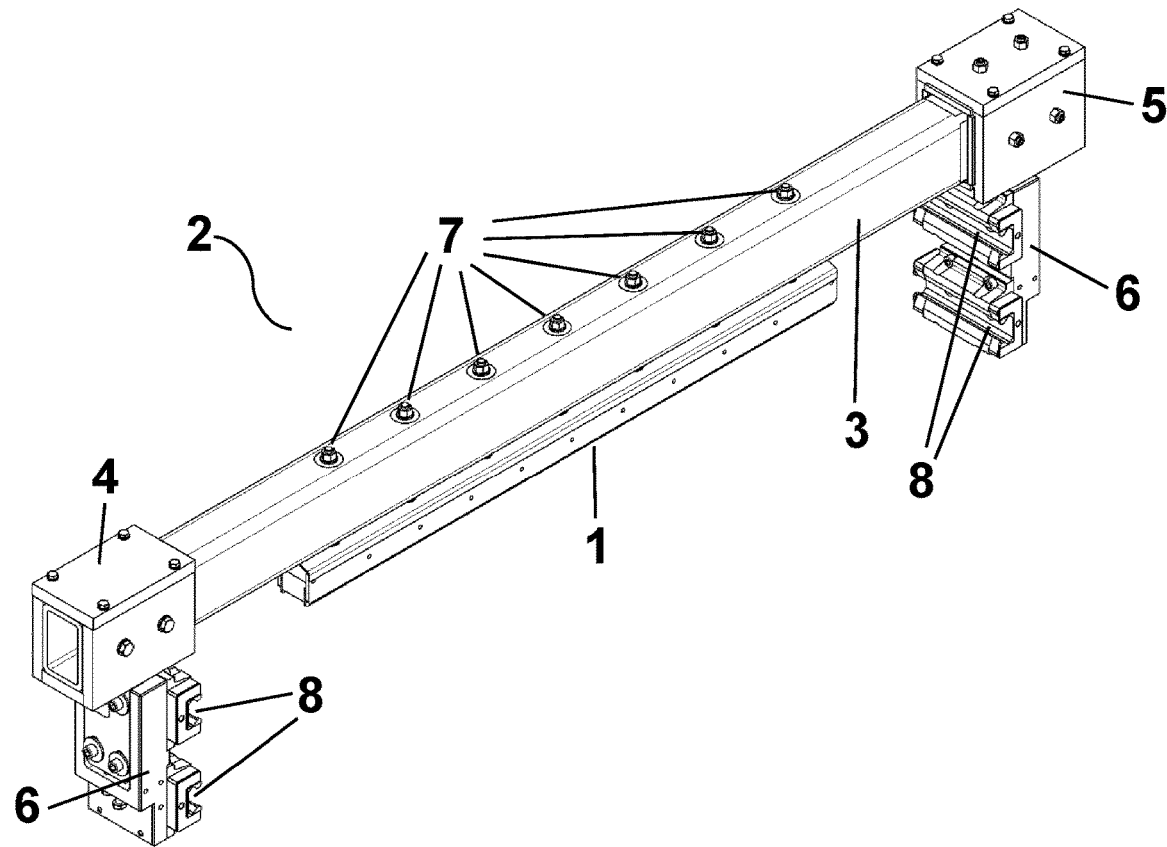
FIG. 2 is a perspective view of the doctor blade unit as viewed from the locating bearing side.
Figure 3:
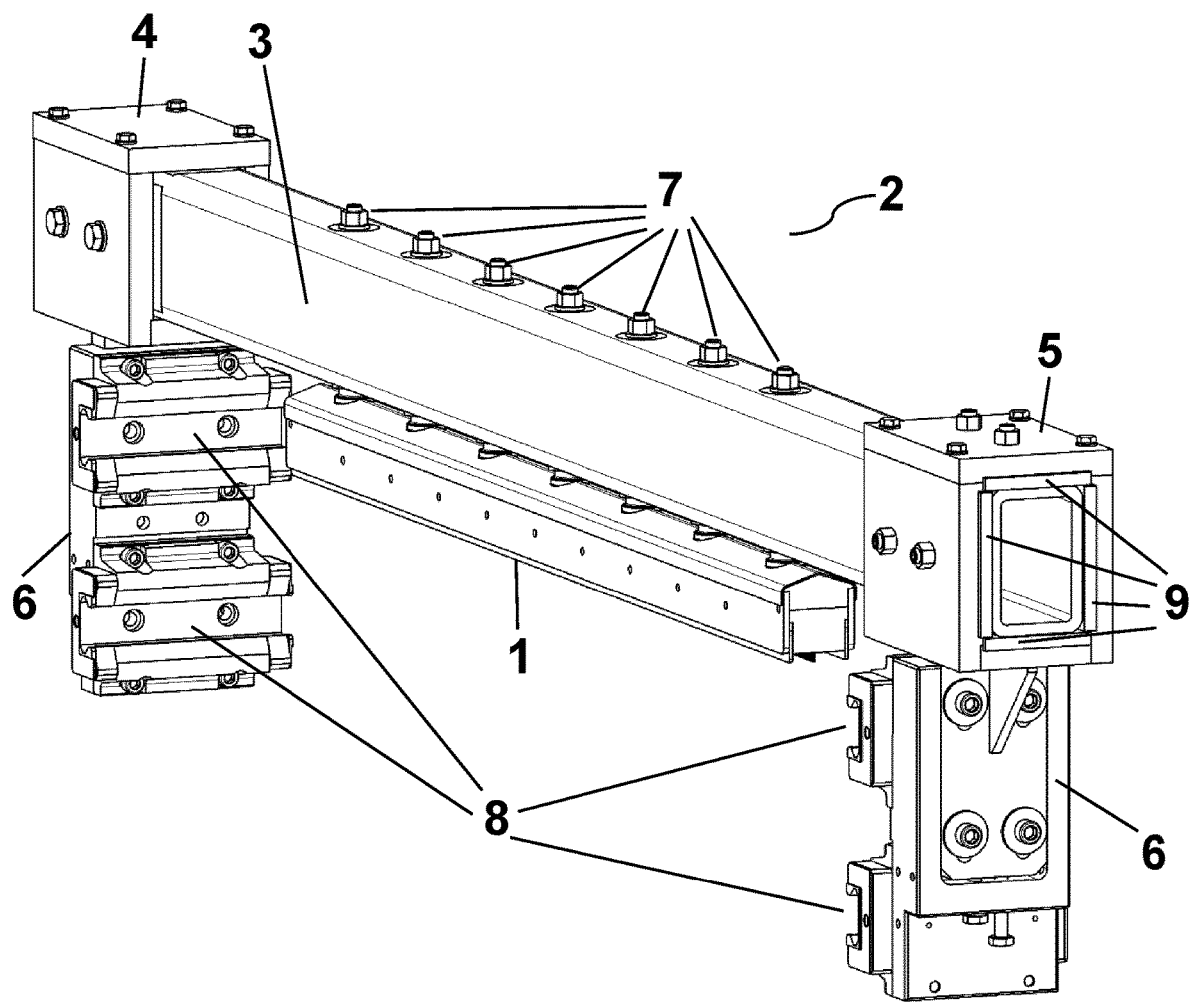
FIG. 3 is a perspective view of the doctor blade unit as viewed from the floating bearing side.

FIG. 1 shows a lateral sectional view of a doctor blade unit according to the invention which is shown perspectively once again in FIG. 2 and FIG. 3. That design variant of the doctor blade unit which is shown in the figures is equipped with a doctor blade (1) with a double blade. The suspension system (2) comprises the crossmember (3) which, in the figure, is mounted on the left-hand side in the locating bearing (4) and on the right-hand side in the floating bearing (5) which are in turn connected in each case to a guide bracket (6). In this example, the doctor blade (1) is fastened to the crossmember (3) by way of seven fastening means (7) in the form of bolts with terminal threads and associated nuts. The length of the doctor blade (1) is 2 m. Accordingly, the doctor blade suspension system has 3.5 fastening means per meter of doctor blade length. The parallelism deviation ΔP which was achieved in this way was 10 μm.

The crossmember (3) supports its own weight and the mechanical load of the doctor blade (1). Its deflection can be compensated for via the fastening means (7), with the result that the doctor blade (1) which is suspended below it can be oriented rectilinearly and parallel to the construction level. As can be seen in FIGS. 2 and 3, the crossmember (3) is configured in this example as a tubular hollow body with a rectangular cross-sectional area and rounded edges. The guide brackets (6) are provided, for guidance with torque rigidity, with in each case two rail receptacles (8) which can be brought into engagement with rails with a substantially trapezoidal cross section in the manner of a dovetail connection. These rails are attached on the side of the construction container to the working surface. In this way, a distortion-free movement of the doctor blade unit over the construction level in order to level the applied powder is ensured.

As can be seen in FIG. 3, the floating bearing (5) is formed here by means of four sliding elements (9) which surround the crossmember (3). An expansion of the crossmember (3) in its longitudinal axis is therefore possible. The crossmember (3) is held rigidly on the locating bearing side, but can expand in the direction of the floating bearing side and can slide through the floating bearing (5), with the result that no constraint forces are introduced into the crossmember (3).

Figure 4:
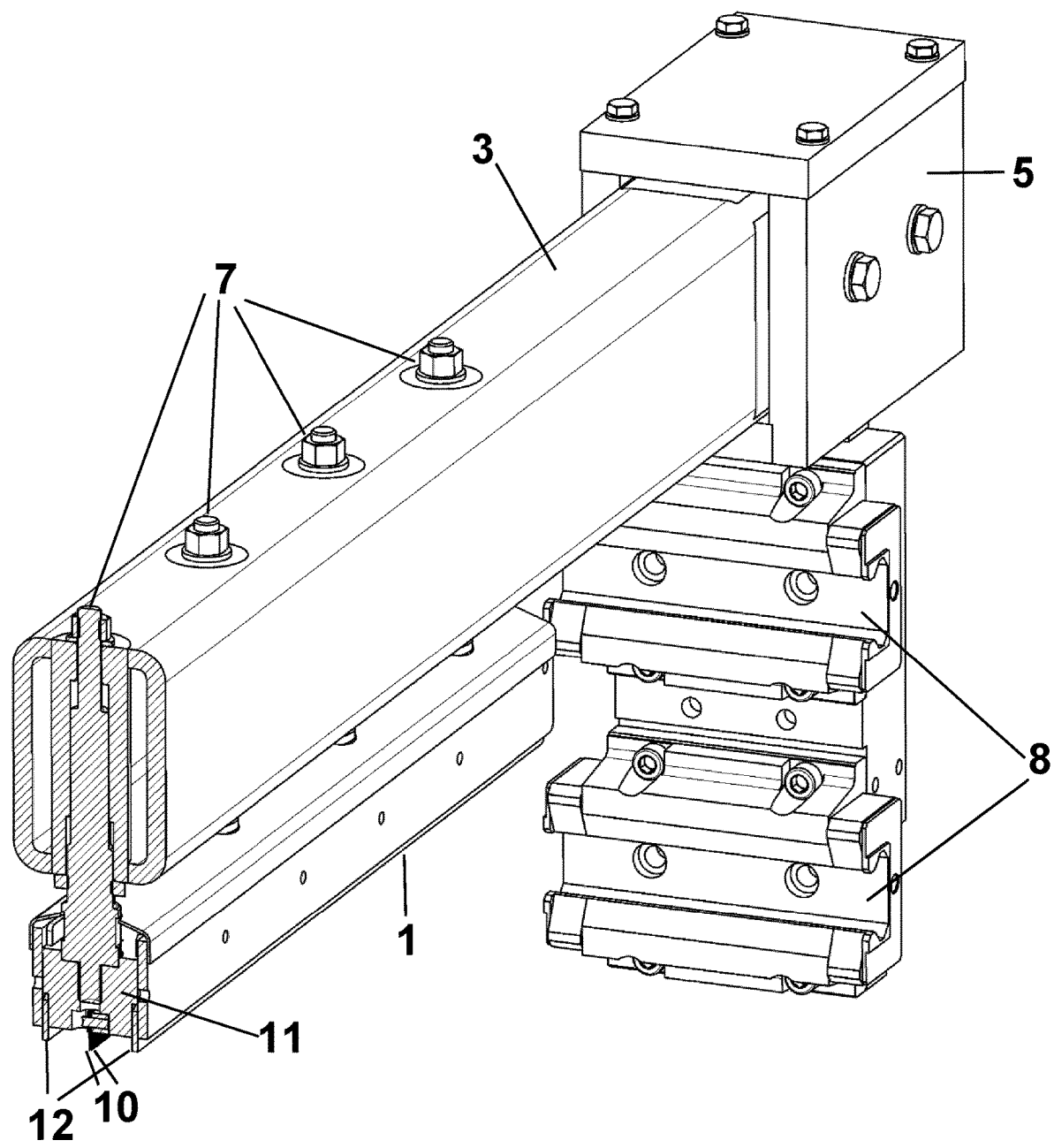
FIG. 4 is a perspective sectional view of the doctor blade unit with a section through a fastening means.
Figure 5:
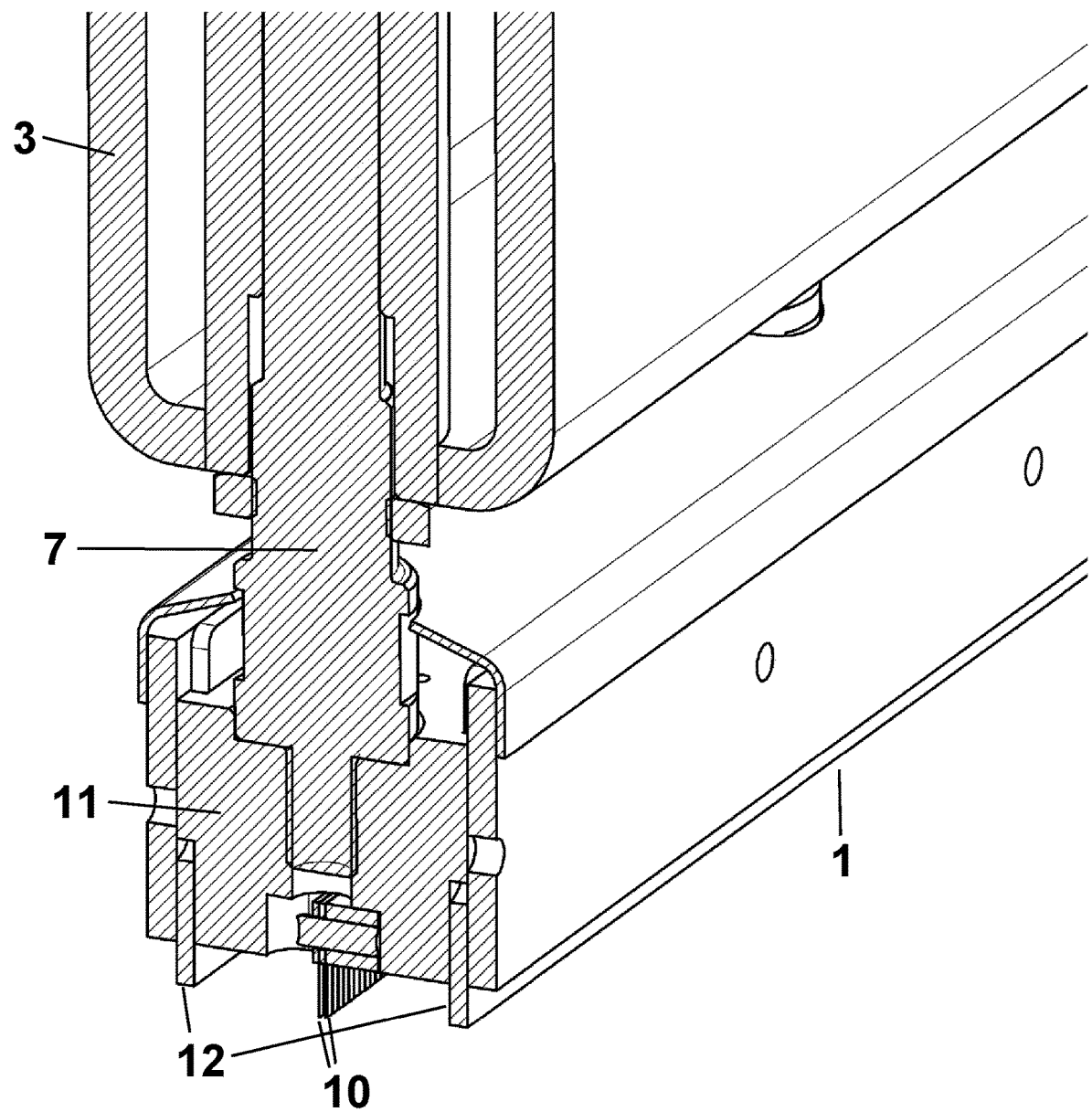
FIG. 5 is an enlarged detail from FIG. 4 which shows the lower region of the fastening means and the doctor blade.

In FIG. 4 and FIG. 5, the region around a fastening means (7) is depicted on an enlarged scale in a sectional illustration. In the example which is shown, the bolts of the fastening means (7) run in a guide sleeve in the interior of the crossmember (3). The bent-over regions specify the maximum actuating travel for the adjustment of the blades (10). The two blades (10) are fastened below a solid central block (11) so as to be symmetrically centered in the middle. The fastening takes place in corresponding cutouts of the solid central block (11) via horizontal bolts, to which the blades (10) are fastened by way of spacer elements so as to be separated from one another. To the sides of this, the two pre-wipers (12) are attached to the outer sides of the central block (11).

A laser sensor system can be attached, for example, to the guide brackets (6) for active control of the doctor blade unit (not shown in the figures), which laser sensor system monitors linearity and parallelism of the doctor blade (1). The information obtained in this way can then be used for re-adjustment, for example, via electric actuating motors which drive the nuts, or piezoelectric elements.

LIST OF DESIGNATIONS

1 Doctor blade
2 Suspension system
3 Crossmember
4 Locating bearing
5 Floating bearing
6 Guide bracket
7 Fastening means
8 Rail receptacle
9 Sliding element
10 Blade
11 Central block
12 Pre-wiper

The invention claimed is:
1. A doctor blade unit for an additive manufacturing system with a pulverous starting material, comprising a doctor blade (1) and a suspension system (2) which is to be mounted in a horizontally movable manner in the additive manufacturing system, characterized in that
the suspension system (2) comprises a crossmember (3) which is mounted on the one side in a locating bearing (4) and on the other side in a floating bearing (5), the crossmember (3) is connected via the locating bearing (4) and the floating bearing (5) in each case to a guide bracket (6), and the doctor blade (1) is fastened in a suspended manner below the crossmember (3) via a multiplicity of fastening means (7) along its length, the fastening means (7) permitting a spacing adjustment between the doctor blade (1) and the crossmember (3) for the parallel orientation of the doctor blade (1) with respect to a construction level of the additive manufacturing system.

2. The doctor blade unit as claimed in claim 1, characterized in that the doctor blade (1) comprises a single blade, double blade or multiple blade.

3. The doctor blade unit as claimed in claim 2, characterized in that the guide brackets (6) are suitable for guidance with torque rigidity in the additive manufacturing system.

4. The doctor blade unit as claimed in claim 3, characterized in that the crossmember (3) is configured as a hollow body.

5. The doctor blade unit as claimed in claim 1, characterized in that the guide brackets (6) are suitable for guidance with torque rigidity in the additive manufacturing system.

6. The doctor blade unit as claimed in claim 1, characterized in that the crossmember (3) is configured as a hollow body.

7. The doctor blade unit as claimed in claim 1, characterized in that the crossmember (3) has a rectangular or oval cross section.

8. The doctor blade unit as claimed in claim 1, characterized in that the locating bearing (4) encloses the crossmember (3) on its periphery on at least two sides, and prevents a movement of the crossmember (3) relative to the locating bearing (4) in all three spatial directions.

9. The doctor blade unit as claimed in claim 1, characterized in that a centering pin is attached to the inner periphery of the locating bearing (4), which centering pin is in positively locking engagement with a corresponding bore in the crossmember (3).

10. The doctor blade unit as claimed in claim 1, characterized in that the floating bearing (5) encloses the crossmember (3) on its periphery with sliding elements in such a way that a movement of the crossmember (3) relative to the floating bearing (5) along its longitudinal axis is made possible, while a movement in the two spatial directions which are perpendicular with respect thereto is prevented.

11. The doctor blade unit as claimed in claim 1, characterized in that the doctor blade (1) has a length of from 0.1 to 5 m.

12. The doctor blade unit as claimed in claim 11, wherein the doctor blade (1) has a length of from 0.3 to 3 m.

13. The doctor blade unit as claimed in claim 1, characterized in that the parallelism deviation $\Delta P$, defined as the difference between the greatest and smallest spacing between the doctor blade (1) and the construction level, is from 1 to 50 µm.

14. The doctor blade unit as claimed in claim 13, wherein the parallelism deviation $\Delta P$ is from 10 to 25 µm.

15. The doctor blade unit as claimed in claim 1, characterized in that the suspension system (2) has from 3 to 30, fastening means (7) per meter of doctor blade length.

16. The doctor blade unit as claimed in claim 15, wherein the suspension system (2) has from 3 to 10 fastening means (7) per meter of doctor blade length.

17. The doctor blade unit as claimed in claim 1, characterized in that, during running operation of the additive manufacturing system, a change in the spacing of the doctor blade (1) from the crossmember (3) is possible by means of electromechanical and/or hydraulic actuators which act on the fastening means (7).

18. The doctor blade unit as claimed in claim 1, characterized in that the fastening means (7) are screwed bolts.

* * * * *